(12) United States Patent
Wimmer et al.

(10) Patent No.: US 7,484,316 B2
(45) Date of Patent: Feb. 3, 2009

(54) NOZZLE ARRANGEMENT FOR A VEHICLE WASHING INSTALLATION AND METHOD FOR CLEANING A VEHICLE

(75) Inventors: Georg Wimmer, Affing (DE); Norbert König, Augsburg (DE)

(73) Assignee: Wash Tec Holding GmbH, Augsburg (DE)

( * ) Notice: Subject to any disclaimer, the term of this patent is extended or adjusted under 35 U.S.C. 154(b) by 246 days.

(21) Appl. No.: 10/571,621

(22) PCT Filed: Aug. 13, 2005

(86) PCT No.: PCT/EP2005/008835

§ 371 (c)(1),
(2), (4) Date: Mar. 13, 2006

(87) PCT Pub. No.: WO2006/027083

PCT Pub. Date: Mar. 16, 2006

(65) Prior Publication Data

US 2007/0028482 A1 Feb. 8, 2007

(30) Foreign Application Priority Data

Sep. 10, 2004 (DE) ...................... 10 2004 044 264

(51) Int. Cl.
*F26B 19/00* (2006.01)

(52) U.S. Cl. .................. 34/666; 34/380; 134/102.1; 15/316.1
(58) Field of Classification Search ................ 34/380, 34/666; 15/316.1; 134/102.1
See application file for complete search history.

(56) References Cited

U.S. PATENT DOCUMENTS

| 3,578,775 | A | * | 5/1971 | McMillen | 134/45 |
| 5,363,865 | A | * | 11/1994 | Brand | 134/56 R |
| 6,148,732 | A | * | 11/2000 | Conway et al. | 104/279 |
| 6,389,640 | B1 | | 5/2002 | Decker et al. | |
| 6,463,617 | B1 | * | 10/2002 | Decker | 15/53.3 |

* cited by examiner

*Primary Examiner*—S. Gravini
(74) *Attorney, Agent, or Firm*—Martin Fleit; Paul D. Bianco; Fleit Gibbons Gutman Bongini & Bianco PL

(57) ABSTRACT

The invention relates to a nozzle arrangement for a vehicle washing installation, a vehicle washing installation equipped with this nozzle arrangement, and to a method in which a drying nozzle (1) that can be rotated about a longitudinal axis (7) by a motor and two high-pressure hoses (2a, 2b) parallel to the longitudinal axis (7) are provided with several high-pressure nozzles (13a, 13b) for high-pressure cleaning. The high-pressure hoses (2a, 2b) are supported so that they can rotate about their longitudinal axes (8a, 8b) according to the invention and coupled to the drying nozzle (1) for common adjustment by means of a mechanism (14, 15a, 15b, 16; 17a, 17b, 18a, 18b).

15 Claims, 3 Drawing Sheets

NOZZLE ARRANGEMENT FOR A VEHICLE WASHING INSTALLATION AND METHOD FOR CLEANING A VEHICLE

FIELD OF THE INVENTION

The invention relates to a nozzle arrangement for a vehicle washing installation, a vehicle washing installation equipped with this nozzle arrangement, and a method for cleaning a vehicle with such a nozzle arrangement.

BACKGROUND OF THE INVENTION

Nozzle arrangements for vehicle washing installations are known from the state of the art, which, in addition to a drying nozzle, also have switchable high-pressure hoses with high-pressure nozzles for washing the front and rear of a vehicle. However, in the known nozzle arrangements, the high-pressure nozzles of the switchable high-pressure hoses have a fixed alignment, i.e., a fixed angle of attack, in order to be able to wash the front and rear parts of a vehicle. However, an optimum angle of attack for the front and rear of a vehicle cannot be selected, because then the horizontal surfaces in the middle region of the vehicle (e.g., the roof) cannot be cleaned or can be cleaned only by including a third high-pressure hose.

In DE 199 16 654 C2, a nozzle arrangement according to this class is disclosed with a drying nozzle that can rotate about a longitudinal axis by means of a motor. The drying nozzle contains a nozzle housing that can pivot at least 360° with a slot-shaped outlet nozzle. At the area of the nozzle housing opposite the outlet nozzle there is a spraying hose extending in the direction of the pivot axis with several spraying nozzles for application of a cleaning or drying agent. There can be another spraying hose with spraying nozzles for supplying washing water for high-pressure cleaning. For adjusting the drying nozzle, there is a crown gear, in which a pinion driven by a servomotor engages, on the nozzle housing.

From EP 1 242 272 B 1, a vehicle washing installation is known which includes a vertical nozzle beam that can move on a frame for high-pressure cleaning of the front and side surfaces and a horizontal nozzle beam that can be adjusted in height on the frame for high-pressure cleaning of the roof area and the hood. However, in this known vehicle washing installation, separate drives for each nozzle beam are required for front and rear washing, as well as for washing the horizontal vehicle surfaces. Therefore, a correspondingly high expense in terms of drives and controls is necessary.

The problem of the invention is to create a nozzle arrangement of the type named above, a vehicle washing installation equipped with this nozzle arrangement, and a method for cleaning a vehicle with such a nozzle arrangement, which also enables reliable high-pressure cleaning and drying of a vehicle without high expenses in terms of controls and drives.

SUMMARY OF THE INVENTION

This problem is solved by a nozzle arrangement, by a vehicle washing installation, and by a method according to the present invention.

An essential advantage of the nozzle arrangement according to the invention is that the nozzle position necessary for optimum cleaning of the various vehicle areas can be set even without a separate drive. The movement necessary for changing the nozzle position is derived from the pivoting movement of the existing drying nozzle by means of a corresponding mechanism. Through appropriate selection of the transmission ratio, an arbitrary pivot angle of the high-pressure hoses can be achieved for a preset pivot angle of the drying nozzle. Thus, e.g., the high-pressure nozzles can be pointed vertically downward for cleaning the horizontal surfaces, while the high-pressure nozzles for washing the front and rear are aligned horizontally or pointed slightly downward (e.g., at an angle of 15° to the horizontal).

In a particularly useful embodiment of the invention, the adjustment of the high-pressure hoses is combined with a switching device, by means of which the two high-pressure hoses can be charged alternately with the high-pressure cleaning fluid. In this way, with as little vibrational movement and as little control expense as possible, an optimum cleaning of the entire vehicle surface can be achieved.

The mechanism for transmitting the rotational movement of the drying nozzle to the two high-pressure hoses can be realized, e.g., as a chain or belt drive. However, the mechanism can also be realized as adjusting levers and pushrods or as friction gears or geared transmissions.

In another advantageous configuration, a nozzle hose that can pivot together with the drying nozzle is arranged in the drying nozzle with several spraying nozzles for spraying chemical cleaning agents. The spraying nozzles are aligned so that the chemical cleaning agent can be sprayed when needed through the outlet nozzle of the drying nozzle onto the vehicle surface.

BRIEF DESCRIPTION OF THE DRAWINGS

Additional details and advantages of the invention result from the following description of two embodiments with reference to the drawing. Shown are.

DETAILED DESCRIPTION OF THE INVENTION

Figure 1:
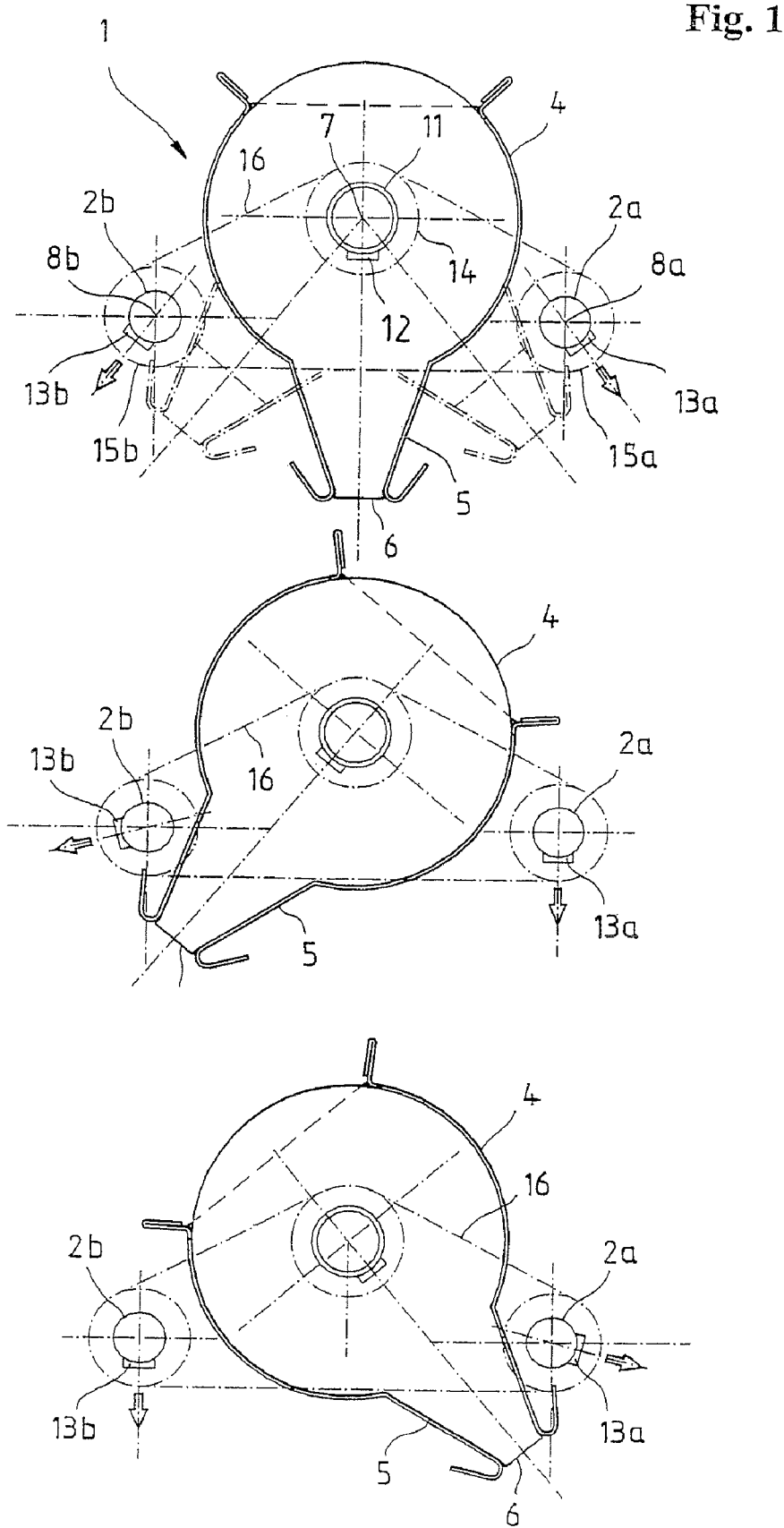
FIG. 1, cross sections of a first embodiment of a nozzle arrangement for a vehicle washing installation in various operating positions.
Figure 2:
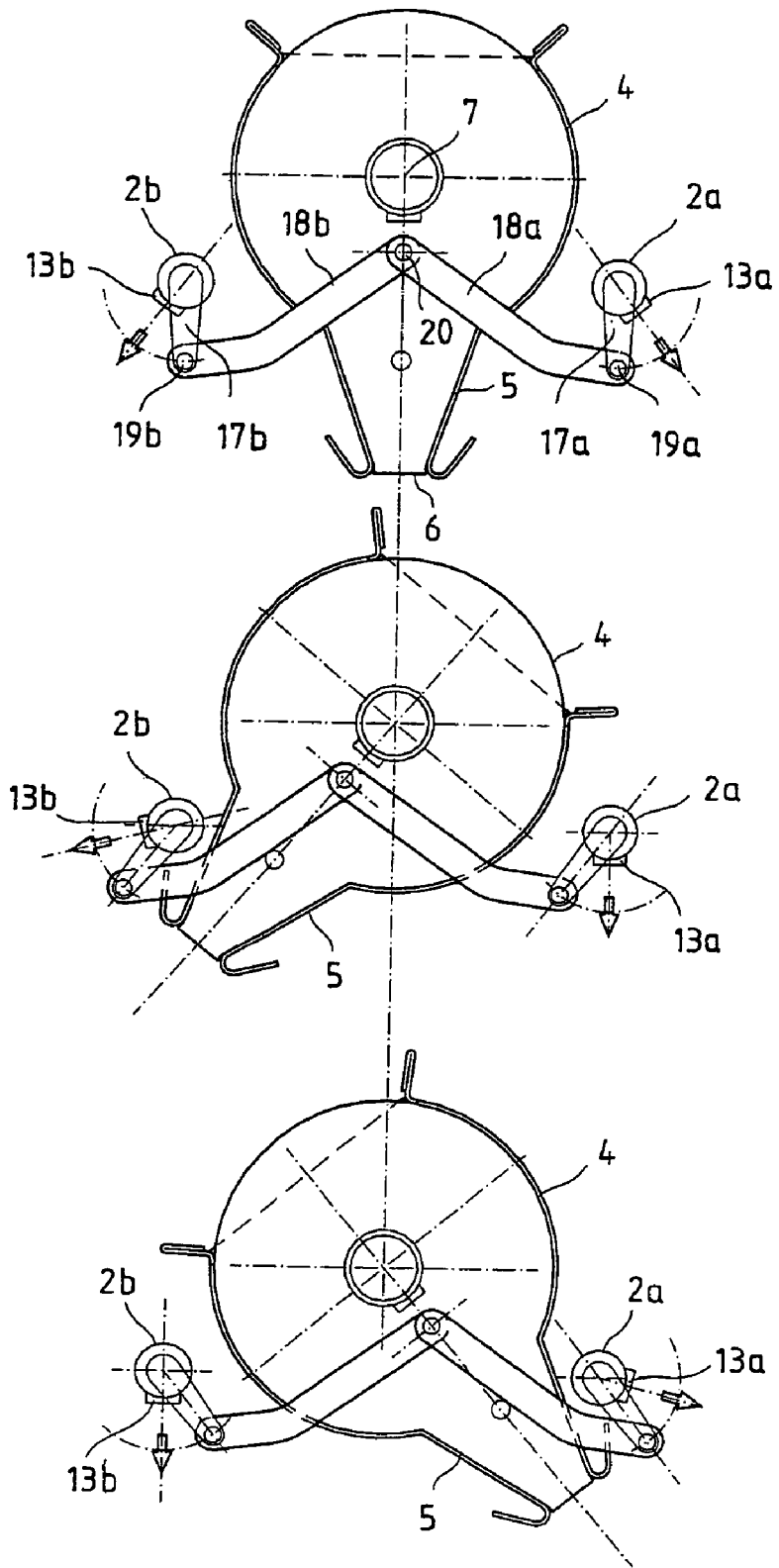
FIG. 2, cross sections of a second embodiment of a nozzle arrangement for a vehicle washing installation in various operating positions.

In FIGS. 1 and 2, two embodiments of a nozzle arrangement are shown in cross section with an adjustable drying nozzle 1 and two parallel, adjustable high-pressure hoses 2a and 2b for high-pressure cleaning of a vehicle in different operating positions.

The drying nozzle 1 contains an essentially tubular housing 4 with an outlet nozzle 5. An airflow generated by a blower and introduced into the housing 4 emerges from the outlet opening 6 of this outlet nozzle for drying a vehicle after the vehicle has been washed. The drying nozzle 1 is configured for the shown configuration as a horizontal drying nozzle, whose housing 4 and outlet nozzle 5 extend perpendicular to the longitudinal direction of the vehicle over the entire vehicle width. The drying nozzle 1 and the two similarly horizontal high-pressure hoses 2a and 2b are arranged on a known, and therefore also only schematically indicated, gantry 10 of a gantry washing installation so that they can rotate about their longitudinal axes 7 or 8a and 8b and can be adjusted in height on a carrier 9, which is only shown schematically in FIG. 3. However, the nozzle arrangement can also be attached to a frame of a car wash so that it is adjustable in height. By means of a not-shown drive, the drying nozzle 1 can be pivoted about its longitudinal axis 7 by a motor. Within the housing 4 of the drying nozzle 1, for the shown configuration, there is a nozzle hose 11 that can pivot together with the drying nozzle 1 for spraying chemical cleaning agents. The nozzle hose 11 contains several spraying nozzles 12, which are aligned such that the cleaning agent can emerge from the outlet nozzle 5 of the drying nozzle 1.

The two high-pressure hoses 2a and 2b are arranged on the right and left of the drying nozzle 1 above the lower outlet opening 6 of the outlet nozzle 5. They contain several high-pressure nozzles 13a or 13b, which are distributed over the length of the high-pressure hoses 2 and through which a cleaning fluid, preferably water under high pressure, can be applied to the vehicle surface. The two high-pressure hoses 2a and 2b that can rotate about their longitudinal axes 8 and that extend parallel to the drying nozzle 1 are coupled to the drying nozzle 1 by means of a mechanism such that the high-pressure nozzles 13a and 13b are adjusted simultaneously with the rotation of the drying nozzle 1.

For the configuration shown in FIG. 1, the mechanism for transmitting the rotational movement of the drying nozzle 1 to the two high-pressure hoses 2 is realized as a chain or belt drive. It comprises a drive wheel 14 locked in rotation with the drying nozzle 1 and an adjustment wheel 15a or 15b, which is locked in rotation with the high-pressure hoses 2a and 2b and over which a chain or a belt 16 runs. In the case of a chain drive, the drive wheel 14 and the adjustment wheels 15a and 15b are formed as chain wheels. In contrast, if the mechanism is configured as a belt mechanism, the drive wheel 14 and the adjustment wheels 15a and 15b are realized as belt pulleys. In a low-noise and consequently positive-fit configuration, the mechanism can be configured, e.g., as a toothed-belt mechanism with a toothed belt and gears adapted to this belt.

For the embodiment shown in FIG. 2, the mechanism is configured as a coupling mechanism with adjustment levers 17a, 17b and pushrods 18a, 18b. Each adjustment lever 17a and 17b is locked in rotation to the two high-pressure hoses 2. One end of each bent pushrod 18a or 18b is hinged to the free end of the adjustment lever 17a and 17b by means of a corresponding articulated pin 19a and 19b. The other ends of the two pushrods 18a and 18b are linked to the housing of the drying nozzle 1 offset to its longitudinal axis 7 by means of articulated pin 20. For the shown configuration, the articulated pin 20 is attached underneath the longitudinal axis 7 of the drying nozzle 1. The other components of the nozzle arrangement are realized according to the first embodiment and therefore also provided with the same reference symbols.

In the two previously described mechanisms, the transmission ratios are selected so that by pivoting the drying nozzle 1 between its extreme positions, the high-pressure nozzles 13a and 13b of the two high-pressure hoses 2a and 2b are also pivoted from a vertical position into a nearly horizontal position. Thus, a separate drive is not required for rotating the two high-pressure hoses 2a and 2b.

If the drying nozzle 1 is located in a middle position shown at the top in FIGS. 1 and 2 with outlet nozzle 6 pointed vertically downward, the two high-pressure nozzles 13a and 13b of the two high-pressure hoses 2a and 2b are pivoted to the right or left by an angle of 37.5° relative to their vertically downward position. If the drying nozzle 1 is rotated by 40° in the clockwise direction from its middle position according to the middle views of FIGS. 1 and 2, the high-pressure nozzles 13a of the right high-pressure hose 2a assume a vertically downward position and the high-pressure nozzles 13b of the left high-pressure hose 2b assume an angle of 75° relative to their vertically downward position. In contrast, if the drying nozzle 1 is rotated approximately 40° in the counterclockwise direction from its middle position, the high-pressure nozzles 13a of the right high-pressure hose 2a assume an angle of 75° relative to their vertically downward position and the high-pressure nozzles 13b of the left high-pressure hose assume a vertically downward position.

In the following, the method for the high-pressure cleaning of a vehicle 21 is explained with the aid of the previously described nozzle arrangement with reference to FIG. 3, wherein it is assumed that the nozzle arrangement is arranged to be adjustable in height on the carrier 9 of the movable gantry 10 of a gantry washing installation. The construction of a gantry washing installation is known as such, so that the parts of the washing installation not required for understanding the invention have been omitted for reasons of clarity.

Figure 3:
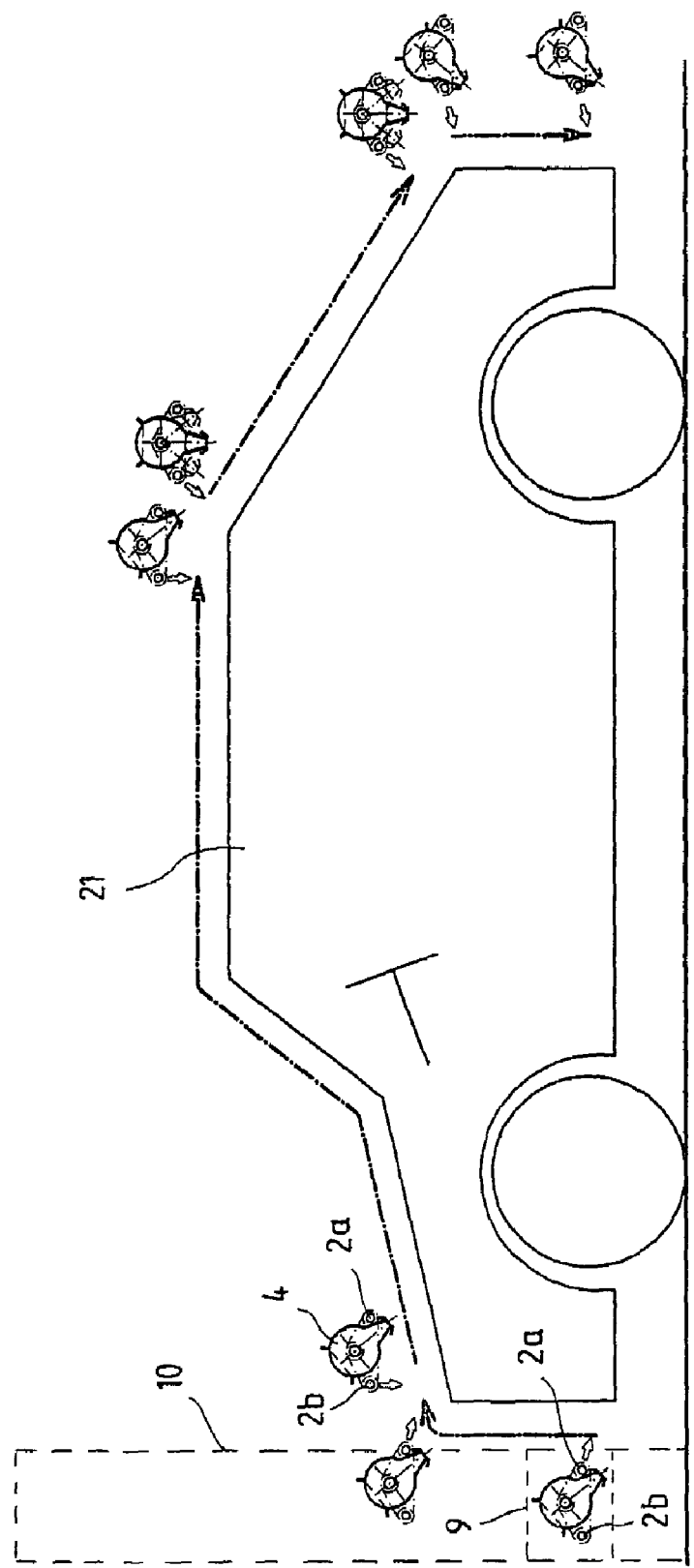
FIG. 3, a schematic representation of a method for cleaning a vehicle with a nozzle arrangement according to FIG. 1 or 2.

When the high-pressure cleaning begins, the nozzle arrangement is located in a bottom position shown at the bottom left according to FIG. 3 relative to the vehicle 21 to be cleaned, wherein the drying nozzle 1 assumes the pivot position shown at the bottom in FIGS. 1 and 2. In this position, the high-pressure nozzles 13a of the front high-pressure hose 2a facing the vehicle 21 are directed at a downward angle toward the vehicle front, while the high-pressure nozzles 13b of the rear high-pressure hose 2b point vertically downward. For cleaning the vertical front part of the vehicle, the nozzle arrangement moves upward, wherein the front high-pressure hose 2a is charged with cleaning fluid under high pressure and the supply of the cleaning fluid to the rear high-pressure hose 2b is disrupted.

If the nozzle arrangement is moved into this position over the top edge of the vehicle front, the nozzle arrangement follows the contours of the vehicle 21 and is moved at a preset distance first over the vehicle hood, the front windshield, and then the vehicle roof. Here, the supply of the cleaning agent to the front high-pressure hose 2a is turned off and the rear high-pressure hose 2b is charged with cleaning fluid under high pressure. For cleaning the vehicle hood, the front windshield, and the vehicle roof, the cleaning jet emerges from the high-pressure nozzles 13b of the rear high-pressure hose 2b.

For cleaning the inclined rear vehicle surfaces, the drying nozzle 1 can be rotated into its middle position while maintaining the cleaning agent supply to the rear high-pressure hose 2b, wherein then the cleaning agent impacts the vehicle surfaces at an angle from above.

For cleaning the vertical rear surfaces, the drying nozzle 1 is rotated into the position shown in the middle in FIGS. 1 and 2. Then the high-pressure nozzles 13b of the rear high-pressure hose 2b again assume an angle of 75° relative to their vertically downward position and the spraying jet contacts the vehicle at a downward angle of 15° relative to the vertical.

In this way, with as little vibrational movement and as little control expense as possible, an optimum cleaning of the entire vehicle surface is achieved.

Through the nozzle hose 11 arranged within the drying nozzle 1, a chemical cleaning agent can be sprayed onto the vehicle surface.

After the high-pressure cleaning ends, the vehicle surface can be dried by means of the drying nozzle 1, wherein the drying nozzle 1 can be pivoted between the positions shown in FIGS. 1 and 2.

The invention claimed is:

1. Vehicle washing apparatus for washing a vehicle positioned front to rear comprising:
   a. an inverted U-shaped gantry comprised of a top and opposed sides movably mounted to traverse reversibly a path parallel to the front to rear axis of a vehicle to be washed from a first gantry position adjacent the rear of the vehicle to a second gantry position adjacent the front of the vehicle;

b. an elongated height adjustable carrier movable mounted on the sides of the gantry for relative movement thereto vertically normal to the movement of the gantry, c. a horizontally disposed elongated drying member, comprised of a tubular housing rotatable about its longitudinal axis, mounted on the carrier, and having at least one downwardly directed nozzle outlet for directing drying air downwardly, the drying member being rotatable through an arc intersecting a vertical axis passing through the longitudinal axis of the drying member;

d. first and second horizontally disposed elongated high pressure hoses rotatably mounted on said carrier, each high pressure hose rotatable about its longitudinal axis, and has at least one downwardly directed nozzle outlet;

e. said first high pressure hose being mounted in proximity to the drying member on its side nearest to said first gantry position and being rotatable through an arc extending from the nozzle outlet pointing vertically down to the nozzle outlet being angularly displaced and pointing at a preselected angle from vertical toward the first gantry position;

f. said second high pressure hose being mounted in proximity to the drying member on its side remote from said first gantry position and being rotatable through an arc extending from the nozzle outlet pointing vertically down to the nozzle outlet being angularly displaced and pointing at a preselected angle from vertical toward the second gantry position;

g. a common drive coupled to the drying member and the pair of high pressure hoses to orient them for a first set position and to rotate them, in both senses and in unison, to a second set position and to a third set position;

h. said drying member and high pressure hoses in their first set position being oriented with the nozzle outlet of the drying member pointed vertically downward, the nozzle outlet of said first high pressure hose pointed at an angle to vertical toward the first gantry position and the nozzle outlet of the second high pressure hose pointed at an angle to vertical toward the second gantry position;

i. said drying member and high pressure hoses in their second set position being oriented with the nozzle outlet of the drying member pointed at an angle to vertical and directed toward the first gantry position, the nozzle outlet of said first high pressure hose is angularly displaced further and directed toward the first gantry position and the nozzle outlet of the second high pressure hose is angularly displaced to be directed substantially vertically downward; and j. said drying member and high pressure hoses in their third set position being oriented with the nozzle outlet of the drying member pointed at an angle to vertical and directed toward the second gantry position, the nozzle outlet of the first high pressure hose is angularly displaced to be directed substantially vertically downward, and the nozzle outlet of said second high pressure hose is angularly displaced beyond its first set position and directed toward the second gantry position 2. Vehicle washing apparatus according to claim 1 wherein the drying member is rotatable through an arc centered and intersecting a vertical axis passing through the longitudinal axis of the drying member.

3. Vehicle washing apparatus according to claim 2 wherein the arc extends for about 40 degrees to either side of the vertical axis passing through the longitudinal axis of the drying member.

4. Vehicle washing apparatus according to claim 1 wherein the nozzle outlets of the first and second high pressure hoses are at an angle to vertical of about 37.5 degrees in the first set position.

5. Vehicle washing apparatus according to claim 3 wherein the nozzle outlets of the first and second high pressure hoses are at an angle to vertical of about 37.5 degrees in the first set position.

6. Vehicle washing apparatus according to claim 1 wherein a third elongated pressure hose is mounted within the dryer member for rotation with the drying member and having at least one nozzle outlet directly aligned with the nozzle outlet of the dryer member.

7. Vehicle washing apparatus according to claim 1 wherein the common drive is a chain drive directly coupled with sprockets locked in rotation with the dryer member and the first and second high pressure hoses.

8. Vehicle washing apparatus according to claim 1 wherein the common drive is a belt drive directly coupled with drive wheels locked in rotation with the dryer member and the first and second high pressure hoses.

9. Vehicle washing apparatus according to claim 1 wherein the common drive is a linkage mechanism comprising adjustment levers having one ends locked in rotation with the high pressure hoses, pushrods pivotally connected at one ends to the other ends of the adjustment levers and pivotally connected at their other end to the dryer member offset to its longitudinal axis.

10. Method for vehicle washing comprising the steps of:

a. establishing a vehicle washing installation comprised of an inverted U-shaped gantry having a top and opposed sides movably mounted to traverse reversibly a path parallel to the front to rear axis of a vehicle to be washed from a first gantry position adjacent the rear of the vehicle to a second gantry position adjacent the front of the vehicle;

b. movably mounting an elongated height adjustable carrier on the sides of the gantry for relative movement thereto vertically normal to the movement of the gantry;

c. rotatably mounting on the carrier a horizontally extending elongated tubular drying member having at least one downwardly directed nozzle outlet for directing drying air downwardly, the drying member being rotatable through an arc intersecting a vertical axis passing through its longitudinal axis;

d. blowing a drying airflow into the drying member to eject through the nozzle outlet of the drying member toward the vehicle;

e. rotatably mounting on the carrier a first elongated high pressure hose having at least one downwardly directed nozzle outlet in proximity to the drying member on its side nearest to said first gantry position, the first elongated high pressure hose being rotatable through an arc extending from its nozzle outlet pointing substantially vertically down to the nozzle outlet being angularly displaced and pointing at a preselected angle from vertical toward the first gantry position;

f. rotatably mounting on the carrier a second elongated high pressure hose having at least one downwardly directed nozzle outlet in proximity to the drying member on its side remote from said first gantry position, the second high pressure hose being rotatable through an arc extending from its nozzle outlet pointing substantially vertically down to the nozzle outlet being angularly displaced and pointing at a preselected angle from vertical toward the second gantry position;

g. feeding high pressure liquid to the first and second high pressure hoses to eject through their nozzle outlets toward a vehicle being washed;

h. driving in common the drying member and the pair of high pressure hoses to orient them by rotation, in both senses and in unison, for first, second and third set positions;

i. wherein said drying member and high pressure hoses in their first set position being oriented with the nozzle outlet of the drying member pointed vertically downward, the nozzle outlet of said first high pressure hose pointed at an angle to vertical toward the first gantry position and the nozzle outlet of the second high pressure hose pointed at an angle to vertical toward the second gantry position;

j. wherein said drying member and high pressure hoses in their second set position being oriented with the nozzle outlet of the drying member pointed at an angle to vertical toward the first gantry position, the nozzle outlet of said first high pressure hose displaced to pointed at a greater angle to vertical toward the first gantry position and the nozzle outlet of the second high pressure hose pointed substantially vertically downward;

k. wherein said drying member and high pressure hoses in their third set position being oriented with the nozzle outlet of the drying member pointed at an angle to vertical toward the second gantry position, the nozzle outlet of said first high pressure hose pointed substantially vertically downwardly and the nozzle outlet of said second high pressure hose angularly displaced at a greater angle toward the second gantry position; and l. moving the gantry over a vehicle to be washed by traversing reversibly a path parallel to the front to rear axis of a vehicle to be washed from the first gantry position adjacent the rear of the vehicle to the second gantry position adjacent the front of the vehicle while controlling the orientation of the drying member and high pressure hoses.

11. Method for vehicle washing according to claim 10 wherein the drying member is rotatable through an arc centered and intersecting a vertical axis passing through the longitudinal axis of the drying member.

12. Method for vehicle washing according to claim 11 wherein the arc extends for about 40 degrees to either side of the vertical axis passing through the longitudinal axis of the drying member.

13. Method for vehicle washing according to claim 10 wherein the nozzle outlets of the first and second high pressure hoses are set at an angle to vertical of about 37.5 degrees in the first set position.

14. Method for vehicle washing according to claim 12 wherein the nozzle outlets of the first and second high pressure hoses are set at an angle to vertical of about 37.5 degrees in the first set position.

15. Method for vehicle washing according to claim 10 including the further step of feeding cleaning fluid via a third elongated pressure hose mounted within the dryer member for rotation with the drying member and having at least one nozzle outlet directly aligned with the nozzle outlet of the dryer member so that the cleaning fluid is ejected directly through the drying member nozzle.

* * * * *